US008800867B2

(12) United States Patent
Majer

(10) Patent No.: US 8,800,867 B2
(45) Date of Patent: *Aug. 12, 2014

(54) DISPENSING MACHINE CONTROL METHOD

(75) Inventor: Luca Doglioni Majer, Carate Urio (IT)

(73) Assignee: Tuttoespresso S.r.l., Origgio (VA) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/064,999

(22) Filed: May 2, 2011

(65) Prior Publication Data

US 2012/0059511 A1 Mar. 8, 2012

Related U.S. Application Data

(60) Division of application No. 11/624,210, filed on Jan. 17, 2007, now Pat. No. 7,950,578, which is a continuation of application No. PCT/IB2005/002300, filed on Aug. 3, 2005.

(30) Foreign Application Priority Data

Aug. 10, 2004 (EP) .................................... 04425625

(51) Int. Cl.
*G06F 7/08* (2006.01)

(52) U.S. Cl.
USPC .......................................................... 235/381

(58) Field of Classification Search
USPC ......................... 235/381, 492, 451, 375, 385; 340/572.1, 572.8, 539.1, 539.11; 221/2, 7; 700/221, 225, 231, 232, 700/236–238, 241; 426/431–433, 435, 436
See application file for complete search history.

(56) References Cited

U.S. PATENT DOCUMENTS

| | | | | |
|---|---|---|---|---|
| 5,608,643 | A | 3/1997 | Ross et al. | |
| 5,930,145 | A * | 7/1999 | Yuyama et al. | 700/231 |
| 6,121,880 | A | 9/2000 | Scott et al. | |
| 6,572,016 | B2 * | 6/2003 | Saveliev et al. | 235/383 |
| 6,636,151 | B2 | 10/2003 | Busick | |
| 6,973,713 | B1 | 12/2005 | Huber et al. | |
| 6,990,391 | B1 * | 1/2006 | Cunha et al. | 700/237 |
| 7,028,861 | B2 * | 4/2006 | Sayers et al. | 222/1 |

(Continued)

FOREIGN PATENT DOCUMENTS

| | | |
|---|---|---|
| JP | 03-259392 | 11/1991 |
| JP | 2002-318511 | 10/2002 |

(Continued)

OTHER PUBLICATIONS

Published European Search Report for corresponding EP Publication No. 2 276 000 A3, published Mar. 30, 2011, 5 pages.

(Continued)

*Primary Examiner* — Michael G Lee
*Assistant Examiner* — Suezu Ellis
(74) *Attorney, Agent, or Firm* — Nixon & Vanderhye, P.C.

(57) ABSTRACT

In order to control the status and the operation of a dispensing machine assembly comprising one or more modules or sub-assemblies, at least one of modules or sub-modules is provided with an electronic tag and the machine is provided with a tag controller device for interacting with said tag by reading, writing and transmitting information data comprising initialization data on or through said tag and operating said dispensing machine according to the information gathered from said tag or tags.

31 Claims, 6 Drawing Sheets

(56) References Cited

U.S. PATENT DOCUMENTS

| | | | | |
|---|---|---|---|---|
| 7,053,773 | B2 | 5/2006 | McGarry et al. | |
| 7,073,710 | B2 * | 7/2006 | Chu | 235/381 |
| 7,439,859 | B2 * | 10/2008 | Humphrey | 340/572.1 |
| 7,490,054 | B2 * | 2/2009 | Reade et al. | 705/16 |
| 7,617,850 | B1 * | 11/2009 | Dorney | 141/94 |
| 7,950,578 | B2 * | 5/2011 | Majer | 235/381 |
| 2001/0028705 | A1 * | 10/2001 | Adams et al. | 379/114.2 |
| 2002/0130136 | A1 * | 9/2002 | Segal | 222/40 |
| 2003/0011476 | A1 * | 1/2003 | Godfrey | 340/572.8 |
| 2003/0023337 | A1 * | 1/2003 | Godfrey et al. | 700/109 |
| 2003/0051767 | A1 * | 3/2003 | Coccaro et al. | 141/351 |
| 2004/0036623 | A1 | 2/2004 | Chung | |
| 2004/0103033 | A1 | 5/2004 | Reade et al. | |
| 2004/0117062 | A1 * | 6/2004 | Bonney et al. | 700/237 |
| 2004/0167664 | A1 * | 8/2004 | Griffin | 700/237 |
| 2004/0196980 | A1 | 10/2004 | Turner et al. | |
| 2004/0220824 | A1 * | 11/2004 | Imai et al. | 705/1 |
| 2005/0061837 | A1 * | 3/2005 | Sudolcan et al. | 222/641 |
| 2005/0120260 | A1 * | 6/2005 | Suzuki et al. | 714/5 |
| 2006/0180647 | A1 * | 8/2006 | Hansen | 235/375 |
| 2008/0116262 | A1 | 5/2008 | Majer | |

FOREIGN PATENT DOCUMENTS

| | | |
|---|---|---|
| JP | 2002-543602 | 12/2002 |
| JP | 2004-164550 | 6/2004 |
| WO | WO 01/43088 | 6/2001 |
| WO | WO 03/005295 A1 | 1/2003 |
| WO | WO 03/071496 | 6/2003 |

OTHER PUBLICATIONS

Decision of Rejection w/ English Translation for Application No. 2011-172822, dated Nov. 5, 2013, 8 pages.

Notice of Reasons for Rejection w/ English Translation for Application No. 2011-172822, dated Apr. 9, 2013, 12 pages.

* cited by examiner

DISPENSING MACHINE CONTROL METHOD

CROSS REFERENCE TO RELATED APPLICATION

This application is a divisional of U.S. application Ser. No. 11/624,210, filed Jan. 17, 2007, now allowed, which is a continuation of Application No. PCT/IB2005/002300, filed Aug. 3, 2005, each incorporated herein by reference in its entirety.

FIELD OF THE INVENTION

The present invention relates to a dispensing machine control method. More particularly, the invention relates to an electronic-tag based assembly or apparatus and method for controlling an electrically operated dispensing machine.

BACKGROUND OF THE INVENTION

In the present application the wording "dispensing machines" generally refers to both so-called "vending" and "dispensing" machines, i.e. to machines including a means of payment of the dispensed product (vending machines), and machines without a means of payment of the dispensed product (dispensing machines). Exemplary vending machines are those for selling to the public newspapers, flowers, CDs, drinks, snacks and similar products; exemplary dispensing machines are machines for dispensing hot and cold beverages, foodstuff, etc. as can be found e.g. in hotel lobbies or airport lounges or even as a domestic appliance. The invention particularly relates to dispensing machines for food products in liquid or solid form. Combinations of the above features, e.g. a coffee dispensing machine having a payment system, are obviously within the scope of the present application.

Dispensing machines provided with different electro-mechanical components as modules (and eventually sub-modules) interconnected one to another via electrical or digital signals are known. A modular design results in maintenance cost reduction, in fact the modules are usually designed to ensure reduced dismantling time and easy replacement in case of failure, even by non specialized personnel, with no need for shipping the machine to the technical assistance plant.

For instance, a typical modular espresso coffee and cappuccino dispensing machine (the assembly) may be composed of several modules (sub-assemblies) comprising one module for brewing coffee from roasted coffee beans, one module for reconstituting liquid milk from granulated dehydrated milk and another module for water filtration, plus the controller module. In this instance, the module for brewing coffee may be composed by the actual brewing unit, at least one solenoid valve, pump, coffee-grinder motor, brewing-unit motor, dosing device and water-heating device.

Dispensing machines are known being provided with systems for reading information stored in electronic tags, mostly transponders or RFID devices (RFIDs), which are secured to the products to be delivered to the customers by means of the dispensing machine.

RFID tags are low-cost, miniaturised "smart" chips generally containing an embedded antenna for transmitting and receiving data to and from a reader (or a scanner) separated from the tags. Generally, electronic tags are attached or secured by the manufacturer to the product packages before the same packages are loaded into the vending machines. The tags may contain several data, such as identification codes, anti-adulteration codes, instructions for the related vending machine, the expiration date of a certain product, etc.

WO01/43088 to Balfour and Harris discloses a dispensing machine having a display, a key-pad and a control unit to connect the machine to a remote central computer. The control unit can be connected to sensors and other devices to asses the status of the machine and perform logical functions such as temperature control, water flow etc. The control unit can also interrogate electronic tags provided on the product containers e.g. to warn of outdated stock being used.

CA 2437137 to Lindsay and Reade discloses a dispensing machine wherein the products in the machine are associated with a smart tag that contains information regarding the food product contained therein. A smart tag reader is incorporated with the dispensing machine and used to retrieve the product information from the smart tags.

WO 01/17893 to Saveliev and Shuster discloses food and beverage containers having attached or connected transponders. A transponder exciter is placed in or near the food or beverage dispenser for energizing the transponder on the food or beverage container, and for discerning information therefrom. The information from the containers can be used to track the containers and control the type and amount of consumable material with which the containers are filled.

WO 03/005295, to Thomas, Cardwell and Hu, concerns an apparatus and the related method for providing tags readable by vending machines, such as programmable RFID tags. Tags include machine-readable information regarding a product to be processed and/or delivered to a customer. For example, the tag may include identification information in electronic form for the product to avoid unauthorized products to be used in the machine.

U.S. Pat. No. 6,354,468, to Riek, discloses a transponder placed on a container adapted to be opened via an electromagnetically activated stopper valve located on a vending machine.

Electronic tags are also provided for carrying out products. For example, US-A-2003/0030539 discloses a vend audit apparatus and method for tracking inventory in a vending machine. The technique includes loading items having tags into a dispensing machine, sensing the tags, and transferring information to a control circuit provided within the machine.

Tracking of the products to be loaded into vending machines, as well as dispensing machines, etc., is achieved by way of passive RFID tags provided within the products, as described in WO 01/26047.

In WO 03/071496 to Schwarzli et al., a vending machine is provided with a counter that records each vend in an electronic tag. The tag is periodically read by an interrogator that downloads and erases the data stored in the tag memory. The aim is the keep track of the vends and reconcile them with the amount of money collected.

Electronic tags may be secured in different ways to a product depending on the nature of the same product. EP-A-0615285 discloses a method for applying transponders to a substrate, such as cardboard packaging material, by adhering an integrated circuit to the substrate, applying a patch antenna to the substrate and the integrated circuit, and applying a sealing layer over the integrated circuit and at least a portion of the antenna.

Other systems are known for embedding or securing an integrated circuit to different products by way of adhesive labels, clips, etc.

The previously mentioned documents relate to apparatus and methods that provide a correlation between the products to be delivered by a dispensing machine and the machine itself. In most cases the known apparatus and methods do not take into account internal operation of the machines, i.e. tags contain information about the foodstuff to be delivered by a machine, but when the machine operates, it recognizes the data according to preset automatic procedures. In WO 03/071496 the tag has a re-writable portion (RAM) where the number of vending events is memorized. Possibly, further operational data such as temperature, type of products sold etc. are memorized in the RAM portion.

Known dispensing machines have several drawbacks that derive mainly from being subject to heavy use and located in many different places, different conditions of use and different maintenance routines.

Maintenance is a major problem.

Modules and single mechanical, electrical or electro-mechanical components of dispensing machines have a limited life-span, usually expressed in terms of "hours of operation" or "number of executed cycles" or other values such as "liters of water", "number of cups", total vends and similar. Also, machines dispensing hot drinks can run according to different procedures according to the product to be dispensed, this resulting in a quicker use of the "life-span" of, e.g. the coffee module with respect to the "milk module".

To avoid breakdowns of the machine and interruption of the sales or of the dispensing services, a periodical maintenance has to be carried out and, in fact, maintenance is provided as part of the average contract for a dispensing machine. Such a maintenance is extremely expensive even in the modular dispensing machines and the increasing labour cost is forcing service companies in charge of such maintenance to become extremely accurate in the use of their time. Moreover, the machine parts have a warranty: e.g. a pump is guaranteed, for instance for a certain amount of cycles corresponding to two hours of operations, or for two years, and has to be replaced free-of-costs if it fails within those conditions.

In view of the above, there is the need to check if the actual use to which the machine was subjected had respected the standard conditions of use of the dispensing machine. As an example, in the previously mentioned case of the pump, there is the need to ascertain what happened to a failed water pump and if it has failed because it was defective or because e.g. the water filter was not replaced at the correct time, or because the pump life-span had expired.

Another problem of these known machines is their quality control, both at the production stage and when maintenance is carried out. Inserting the wrong module could result in damaging the machine or in a bad beverage being dispensed.

A still further problem derives from the fact that traditional dispensing machines do not allow for inhibiting the activation of specific modules. For example, it could be desirable for the manufacturer or the owner of a vending machine, for example a coffee dispensing machine, to limit one or more functions of the machine to the loaner or to a specific user or group of users of the same machine. It is also desirable to deny the use of a module, especially a food module, if the state or the origin of the said module is not correct, i.e. if the module does not come from the machine manufacturer or loaner or if its life span has expired.

It is known, e.g. from previously mentioned application WO 03/005295, to provide the food container with a tag that includes identification information such as a number, and to provide the controller with a list of all the identification information that has been applied to all the tags that can be "used" by the dispensing machine. This results in the necessity of memorizing a huge amount of information in the controller memory and in periodically updating it: the I.D. number of each food container has to be memorized and new numbers must be provided to be sure the relevant containers can be used in the machine. The same process has to be carried out in all the machines that may make use of the tagged food containers.

Such memorizing operations are long, complex and source of possible errors.

Thus, there is the need for an active control of the dispensing machines, of their modules and components and of their operation, that is reliable, easy and cost-effective.

More particularly, there is a need for a dispensing machine that could provide an improved and new control on the machine operation and on the consumables associated with the dispensing machine operation.

SUMMARY OF THE INVENTION

It is an object of the present invention to solve the above mentioned problems and to provide a novel dispensing machine and the related method for checking and controlling the operation and the state of dispensing machines and their modules or consumables.

To this regard, the wording "consumables" is intended to mean any kind of module that is subject to wear or consumption; e.g. a pump having a life-span of 200 operation hours is a "consumable" because after the 200 hours are used the pump has to be serviced, but also a container for food products is a module and is a "consumable" according to the present invention: e.g. a container for 3 kg of coffee beans is a module that can be removed and changed or re-filled when it is empty (at the end of its life-span) and is therefore a "consumable" in the sense of this application.

It is another object of the present invention to provide an apparatus and the related method for collecting data related to the operation and/or on the state of one or more modules/components of dispensing machines and eventually for transmitting such data to the manufacturer or service-provider of the same machines.

It is a further object of the present invention to provide an apparatus and the related method for selectively inhibiting the functions of a vending machine depending on the identity of the proprietor, holder or loaner and/or on the state or origin of each of the components or modules.

It is a further object of the present invention to provide an apparatus, easy to assemble and relatively not expensive, wherein the status and the operating conditions of the dispensing machine can be detected in an easy and quick way. A dispensing machine assembly, accordingly, will be comprising one or more modules or sub-assemblies, at least one of said modules being provided with a readable memory device, or tag, having a read-only memory portion and a writeable memory portion, said machine comprising a controller device for interacting with said memory device and is characterized in that said tag contains identification data to identify said module, said data including the characteristics of the modules and/or the components of the machine assembly, wherein said controller comprises information to identify said module by reading the data of the module tag and comparing said data with a configuration table of acceptable machine configurations and further comprises means to allow or deny use of said module according to said comparison result.

These and other objects are achieved by the present invention which concerns a vending machine assembly comprising one or more modules or sub-assemblies, characterized according to claim 1.

According to a preferred embodiment, the tag can be written, preferably several times, and the device interacting with said tag, is a tag reading and writing device. In other words, in the preferred embodiment, the interacting device, i.e. the tag controller, is able to both read and alter the data contained in the component.

A machine of this type is characterized according to claim 5

The tag controller comprises a tag reader, a CPU for controlling the machine operation can be part of the controller or separate from it but connected to the same.

A further object of the invention is a method of controlling the assembly, operation and/or servicing of a dispensing machine assembly comprising one or more modules or sub-assemblies, characterized according to claim 8. A further method is characterized according to claim 12.

The invention provides several advantages over the known art.

By identifying the (sub)module with a tag having identification data selected from initialization date or algorithm-coded data, usually in a read-only memory portion, the controller can check that the module comes from an authorized source and can identify the date of initial use or of production.

Moreover, the control unit will check through the further data identifying the single (sub)modules if each of the (sub) modules is consistent with one of the allowed machine configurations, i.e. a "configuration-table". By way of example, a dispensing machine comprising a configuration table consisting in a combination of coffee+milk (granulated)+tea modules, will accept only a product module, or sub-assembly component, that is consistent with the list of configurations of assemblies or sub-assemblies that the dispensing machine can accept (i.e. the configuration table). If a (sub)module that is not in the list of authorized configurations (the configuration table), i.e. a module that should not be processed by the machine with its actual modules, is inserted in the place of an authorized one, e.g. a cocoa-chocolate tray, the wrong module is identified and the control device (controller) denies the use of the wrongly inserted module and dispensing of the cocoa-chocolate product from the inserted tray does not occur.

Besides checking if a newly inserted module is an authorized module, i.e. if it is or not in the memorized list, or configuration table, the controller can also reconfigure the operation of the machine. This is carried out when an authorized module replaces another module, but is different from the replaced one. In this case the controller will check the authorization by looking into the configuration table and, upon authorization, will modify the operation of one or more of its other modules to accept and operate according to the new one.

Moreover, when the machine is serviced, it is possible to ascertain the "history" of the module or component that is under maintenance and track back the module or component effective usage.

Also quality control is made easier, because the electronic tags store identification codes, readable only by the controller, which guarantee the full compatibility of a module or tray or component with the machine's desired specifications (e.g. voltage etc.).

Another advantage is that it is possible to limit the use of the machine with unauthorized modules or components, including food product containers, and with modules the life-span of which has expired and that could be dangerous if used (e.g. a boiler, a water filter etc.).

A still further advantage results from the use of a re-writeable tag: in fact, the number of hours of service or number of cycles or number of remaining cycles, can be written on the tag; similarly, in a food product module, the amount of food (e.g. coffee powder, etc.) used can be written on the tag module, that will have a consumable portion that decreases with time. In one embodiment, the tag is initially provided with data for e.g. the total number of cycles and at each cycle a portion of the memory is altered (e.g. erased) until a zero value is obtained.

BRIEF DESCRIPTION OF THE DRAWINGS

The invention will now be described in greater detail with reference to the drawings enclosed as a non-restrictive example, where.

DESCRIPTION OF THE PREFERRED EMBODIMENTS

Figure 1:
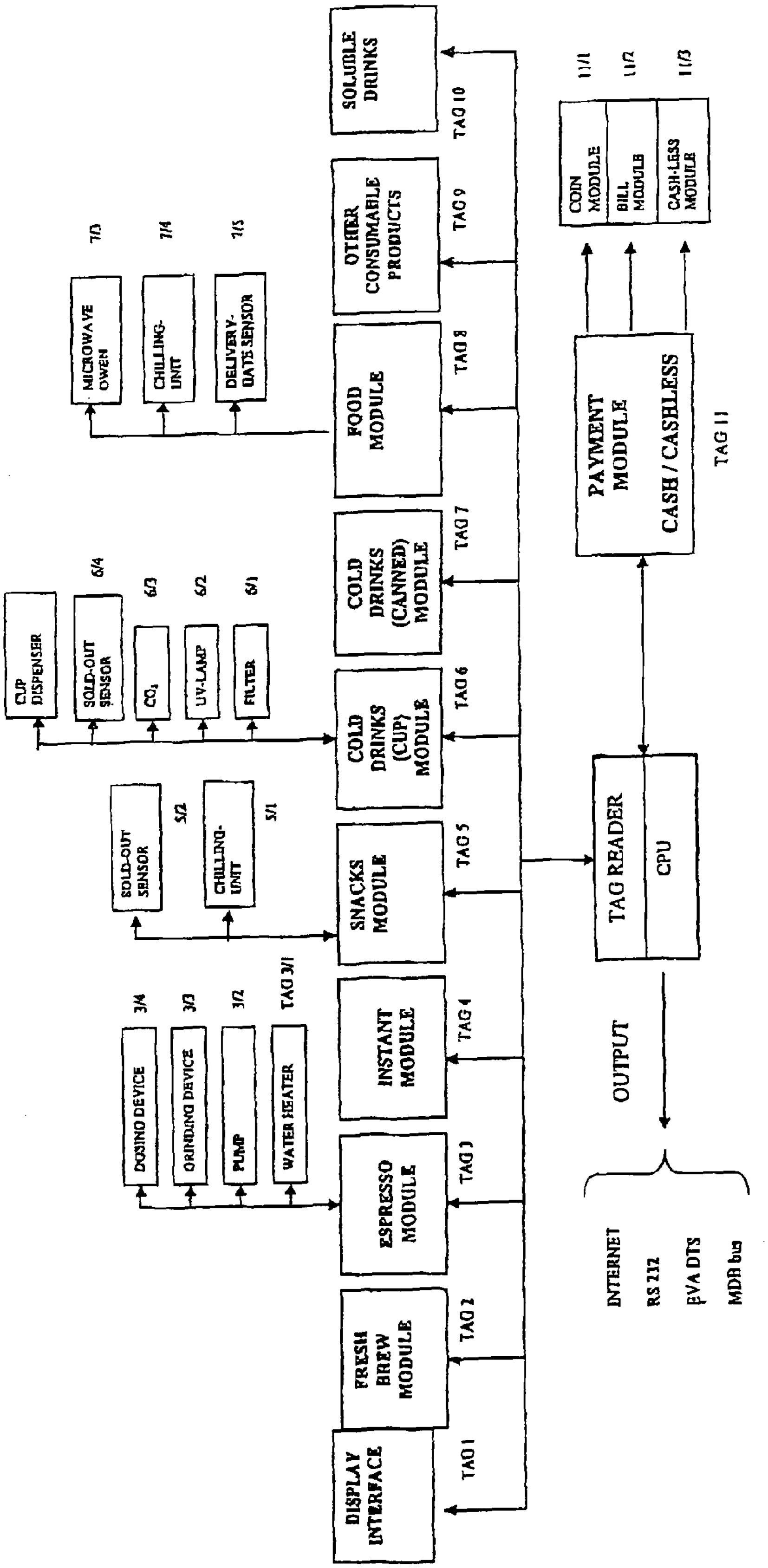
FIG. 1 is a scheme of a dispensing machine according to the invention.

FIG. 1 refers to a dispensing machine provided with several modules, sub-modules and components. In particular FIG. 1 is a scheme which shows the internal logic layout of a dispensing machine for dispensing snacks, foodstuff, cold drinks, espresso coffee, etc., each product being prepared and dispensed by the related module. The sub-assemblies are indicative of one possible configuration for some modules without restricting the amount of sub-modules or modules and combinations thereof that can comprise one specific dispensing system.

Modules may comprise several sub-modules or components. For example, the module "ESPRESSO" will comprise a power unit, a dosing device, a pump, a boiler, a grinder or similar devices. Similarly, the module "COLD DRINKS" will comprise sub-module for processing cold drinks including a filter, a UV lamp, a $CO_2$ (carbonating unit) sub-module and a sold-out sensor.

In FIG. 1 each module and each sub-module or component is provided with a tag; tags of submodules are numbered according to the module tag, i.e. tags for component and sub-modules of espresso module having tag 3 are referenced to as tags 3/1,3/2,3/3 and 3/4.

To interact with the client/operator a display module and a control panel for receiving instructions by the users are usually provided, even if they are not shown in all the figures; other inputting methods (e.g. a chip card) may also be made available.

The machine of FIG. 1 is a vending machine and is provided with a payment module comprising a manual payment system, i.e. a module for collecting coins, or with a cashless payment system, i.e. a magnetic card or (as hereinafter discussed) a tag or a transponder reader; a bill validator (banknote reader) sub-module is also provided.

Each module is connected to a control unit CPU (control processing unit) by way of traditional electrical connections. The CPU is provided with a tag reader, i.e. means for reading the tags, and controls the operation of the modules depending on the instructions received by the manufacturer or by the user or also by the actual owner of the machine. The tag reader can be separate from the CPU and located away from it but, obviously, it is connected to the same (by wire or wireless means).

In operation, when a customer requests an espresso coffee, the CPU activates according to a pre-set procedure the module "ESPRESSO" which operates for preparing and dispensing such beverage according to the preferences indicated by the customer. Customers usually interact with the control unit through a display or a control panel. Typically, users ask for a particular item or combination of items of a preset menu shown on the machine itself, the control panel or the display.

Products to be dispensed may be loaded into the machine already packed, e.g. canned drinks and snacks, or may be instantly prepared by one or more modules from ingredients which are stored into suitable reservoirs of the same machine, e.g. espresso or fresh brew coffee and cold drinks in a cup. For example, snacks are usually loaded into suitable trays provided within the machine in their own wrapping, while hot beverages are usually prepared by one or more modules from basic ingredients, like de-hydrated milk, cocoa powder, sugar or the like, stored in containers that are part of a food module of the dispensing machine.

Figure 2:
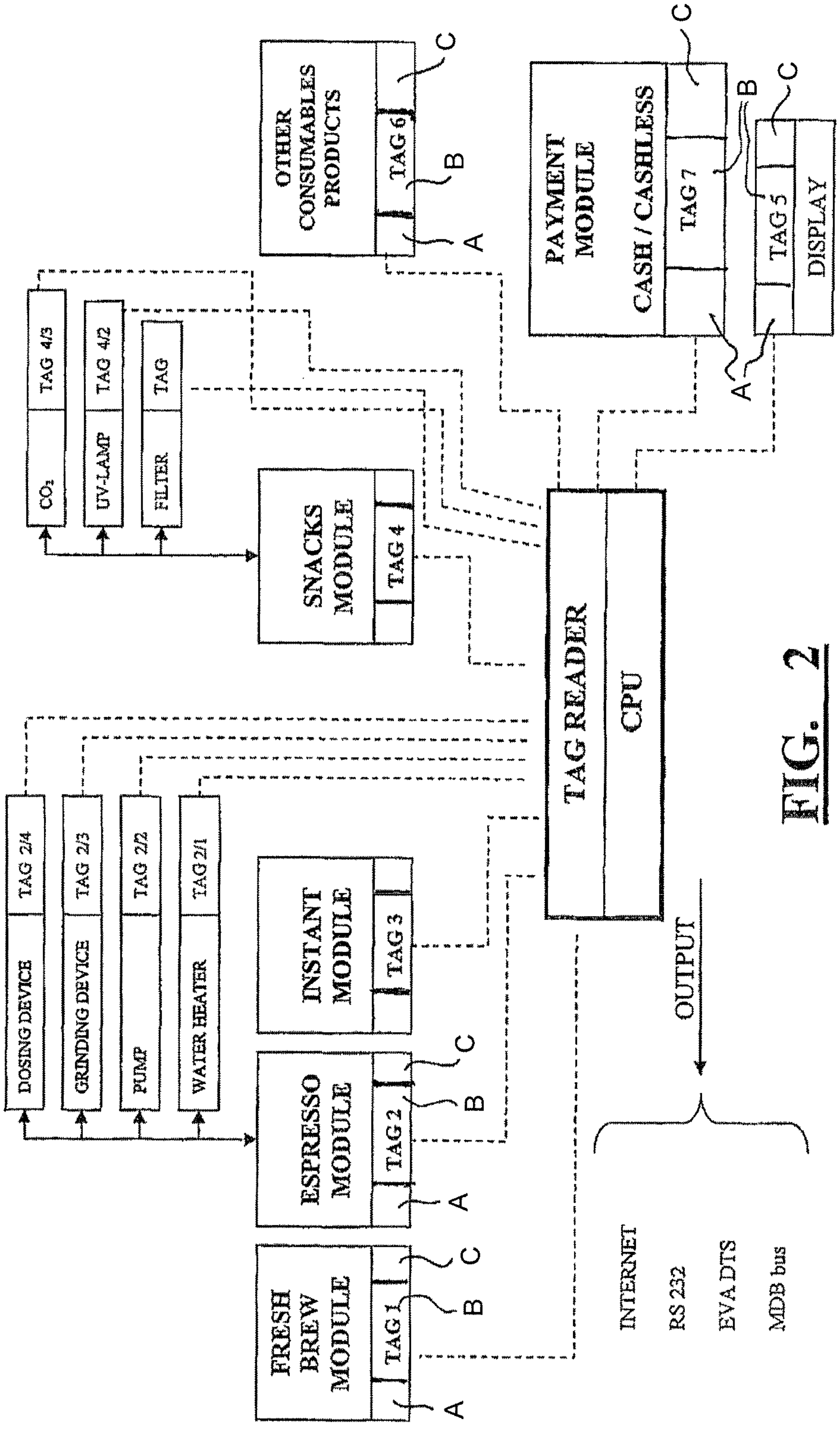
FIG. 2 is a scheme of another dispensing machine provided with an apparatus according to the present invention.
Figure 3:
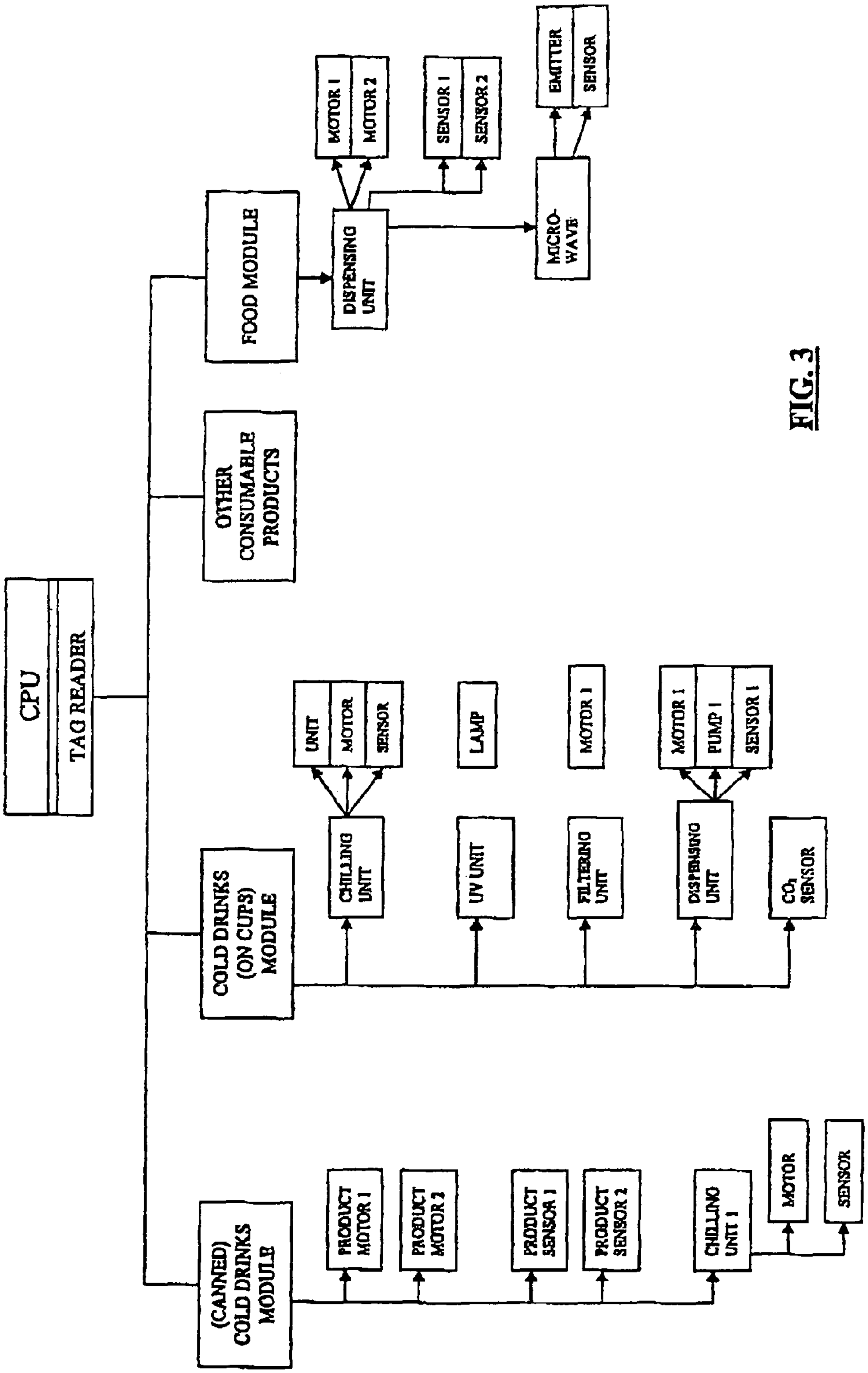
FIG. 3 is a scheme of a further dispensing machine according to the invention.

FIG. 2 is a scheme of a further dispensing machine provided with an apparatus according to the present invention. The machine comprises six modules and some sub-modules or components such as motors, filters, etc., that are disclosed with the relevant tags. The apparatus comprises at least one readable memory device, or tag, linked to a module and a memory reader device (tag reader) connected to the CPU or placed within the machine or remotely located, separated from the machine but connected to it. All these possible locations of the tag controller with respect to the dispensing machine fall within the scope of the definition in claim 1 "said machine comprises a controller device". It is important to notice that the tag reader may be physically separated from the CPU, thus allowing to consider the CPU itself a tag equipped module where information can be stored and retrieved from. In this embodiment the tag reader comprises the memory means, including means where the information required for identifying the module (e.g. the configuration list or the coding algorithm) is stored.

Moreover, a possible embodiment of the invention comprises two (or more) dispensing machines, in which a first dispensing machine (master) houses the tag reader and the CPU, and one or more further dispensing machines (slave) are provided with modules with tags and are connected to the first machine. The controller of the first machine controls the operation of the whole group of machines.

As above mentioned, the readable memory device is an electronic tag. The tag may be a passive tag or an active one. For example the tag may be a RFID device. Preferably, an electronic tag is applied to each module or sub-module/component of the dispensing machine. More preferably, also the sub-modules (sub-assemblies) and the components are supplied with electronic tags. Tags can be physically attached to the related module, for example embedded in a component of the hardware, or they can be independent and physically detached from the same. As will be later discussed more in detail, this is the case when the module relates to consumables such as the food product to dispense: in an advantageous embodiment there is only one tag which takes into account the total amount of food product (e.g. 3 kg coffee or 300 coffee units) and that is not located on the single product package but is separate from it.

Passive tags have no power unit of their own and transmit data or information regarding the related module to the CPU reader or to any suitable device for processing such data, when an interrogation signal is generated for example by the CPU reader or by an equivalent device. The interrogation signal is, in this instance, also an activation signal which also powers the tag. Active tags have their own power supply and, consequently, they can transmit said data or information to any suitable receiving device independently, that is regardless of whether an external interrogation signal is provided.

Due to the relatively high cost of the active electronic tags, the apparatus of the invention preferably provides passive tags. Nevertheless, some embodiments of the apparatus may comprise at least one active tag, for example interfaced with a sensor and applied to the most important module(s) or sub-assembly of the machine, e.g. to the boiler, in order to sense its condition, e.g. the boiler pressure and temperature, and inform the controller if there is a deviation of the element from the standard conditions.

Such a sensor-tag is disclosed e.g. in U.S. Pat. No. 6,546, 795.

Suitable passive tags are the RFIDs by Fujitsu or by ST-Microelectronics such as ST SRIX512 or XRA00; a suitable tag reader is e.g., ST CRX-14. These tags are preferably provided with a write-once, read-many memory and a with re-writable memory.

In a preferred embodiment of the machine, the tags are RFIDs having a first writable memory and a second re-writable memory. Preferably, the tag has a read-only portion, a write-once portion, and re-writable portion (e.g., respectively A, B, and C, of FIG. 2). Each tag is associated to a module or sub-assembly or a component of the machine and communicates with a tag reader linked to the CPU. The tag reader may be separated from the CPU, and may be located within the machine or outside in a remote location. What is essential is that the tag reader can read the electronic tags and access the information or the data stored within the tags. This can be accomplished in a known way: for example the scanner generates an RF interrogation signal which activates the tags. The tags, once activated, transmit the information saved in their memories to the reader, by way of RF signals, for allowing a successive processing of such information by the CPU. Information or data may be saved in the tags as codes.

The tag will transmit information data concerning the status of the component, if it comprises a sensing device such as the one described in the above mentioned U.S. Pat. No. 6,546, 795.

FIGS. 3-6 disclose further embodiments of the invention dispensing machine provided with sensors. It is understood that also in these embodiments the modules and sub-modules/components are provided with tags, some of the tags being connected with a sensor. E.g., in the embodiment shown in FIG. 3 the chilling units and the dispensing unit are provided with a sensor for the pump and a sensor for the temperature of the chilling unit; a sensor-tag for the $CO_2$ unit is also present.

Figure 5:
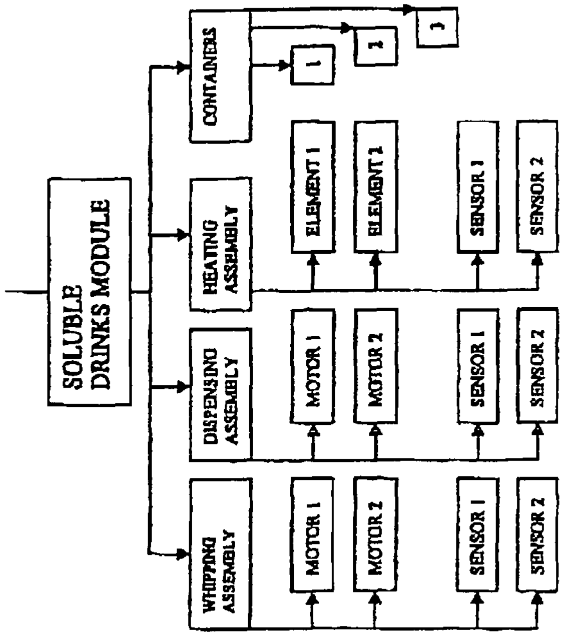
FIG. 5 is a scheme of a module for the machine of FIG. 4.
Figure 4:
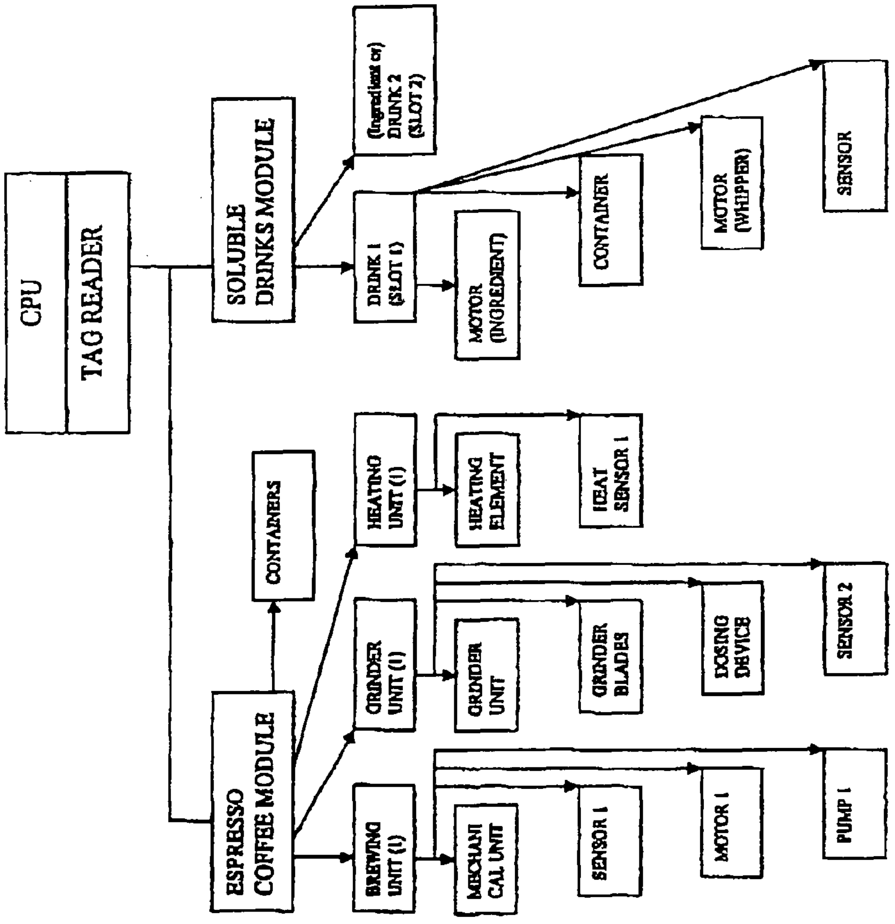
FIG. 4 is a scheme of a still further dispensing machine.
Figure 6:
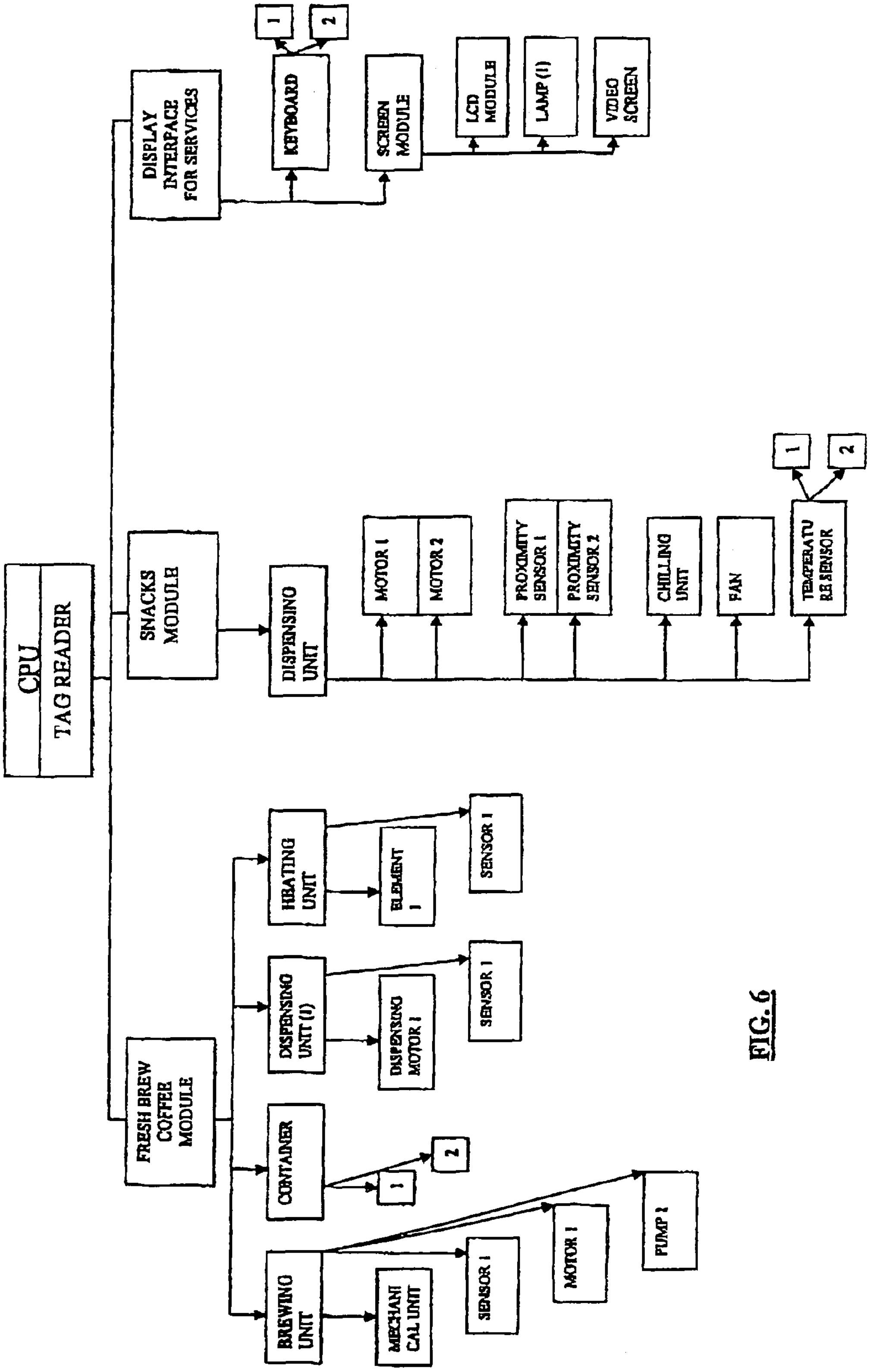
FIG. 6 is a scheme of still another dispensing machine.

FIG. 5 shows an alternative module for the soluble drinks module of the dispensing machine of FIG. 4, where an espresso module is detailed. The soluble drinks module, e.g. granulated milk and tea, is provided with two whipping, dispensing and heating sub-sub-modules in view of the different processing requirements (water temperature, amount of product etc.) of milk vs. tea. Thus, two motors are provided for the whipping and dispensing assemblies and two heating elements are provided for the heating sub-module; each module, sub-module and component is provided with a tag or a tag-and-sensor. The dispensing machine of FIG. 6 is also exemplary of an embodiment of the invention and details the display/interface module.

The identification data can comprise initialization data including the date of first use of the module, e.g. when the module was first assembled to the machine, and/or the date of production of the module or date of testing or quality testing, of the produced module. It is thus possible to see if a module had already been used with another machine.

Alternatively or in addition to the above data, the identification data will comprise coded data. More specifically, the tag comprises a read-only memory containing first data that are readable, usually these data are the tag serial number, and a second memory portion containing second data. The second data contain the first data written through a coding algorithm, to provide the required identification data. The controller will thus need a very short internal information to verify the origin of the module and to decide if it can be used: namely the controller will require to know the present date (i.e. the actual calendar day, month and year), a configuration table, and the algorithm (or algorithms) that are used to transform the first data into the—coded—second data.

Comparison between the read data and the internal information, or data list, can thus be carried out quickly and efficiently; the controller information will in fact be free of a list of all the codes used to identify each single module as in prior art solutions, because it will be sufficient to identify the module through at least one of the actual calendar date, the class or type of module and the algorithm through which the tag serial number, or a similar read-only data, has been coded.

The date is obtained in a way known per se, e.g. by means of an internal clock suitable to provide this information to the controller. The class or type of module is an information written in the tag, usually in a write-once portion of the tag. The memory of the controller is storing the information on the configuration table, i.e. a list of possible combinations of modules.

In order to identify each module (especially with food product modules or packages) the controller only requires to have memorized an algorithm or a list of algorithms. Each tag has different data memorized in a read-only portion of the tag memory: this data is e.g. the serial number of the tag, memorized in said portion by the tag manufacturer. The machine manufacturer will code each serial number through the same algorithm and will memorize the coded data thus obtained (i.e. the result of applying the algorithm to the data readable in the read-only portion) in the write-once portion of the tag. In this way it will be possible to obtain identification data that are different for each tag but that have in common the coding algorithm through which they have been obtained. All the tags coming from a same authorized origin will thus be provided with an ID code obtained through the same algorithm; therefore, the controller will only need to have a list of authorized algorithms in order to check if the module is an authorized module. The controller will apply the authorized algorithm(s) from its memory to the first tag data, i.e. the data memorized in the read only portion of the module. If the result obtained, i.e. the second data, is the same as that in the write-once portion of the module, the tag is authorized.

The above features will be explained with reference to table 1 and table 2 that show a non limiting example of information which can be saved in a tag. In particular, table 1 refers to a dispensing machine with a coffee (assembly 1) and a chocolate module (assembly 2). The assembly 1 comprises three sub-assemblies 1-3, namely an espresso module, a boiler and a grinder motor. The espresso module is comprising two sub-sub-assemblies: a motor 5 and an infusion module 6, each being provided with a tag according to the present invention.

The tag of the boiler sub-assembly 2 has a serial number (002) which is saved in the read-only memory by the manufacturer of the tag, for example ST-Microelectronics. The tag also contains an identification code (101) of the sub-assembly 2 that is written in the write-once memory portion of the tag by the manufacturer of the dispensing machine. As mentioned, the ID code of the module or component is obtained from the serial number 002 saved in the read-only memory by the tag manufacturer by modifying said code through an algorithm. In other words, when the tag is secured to the module (or even before it or after), a tag controller reads said first data in the read-only memory, elaborates said first data through an algorithm and writes said elaborated data in a write-once portion of the writable memory of the tag as an ID data: only the tags that have the serial number elaborated according the correct algorithm are acceptable and "authentic" modules.

In this example initial code 002 was transformed into 101 through algorithm [serial number+200]/2 i.e. [002+200]/2=101. The same algorithm was applied to the other serial numbers of the tags.

In this way the CPU, upon receiving such information from the tag reader, will control that the ID tag is obtained through the correct algorithm and then allow for the operation of the sub-assembly 2 which is recognized as an endorsed part of the machine provided by the same manufacturer with preset quality standards.

The tag identification data preferably also provides information regarding the operating parameters of the module to which it is applied. As shown in table 1, a code may be stored in the tag to specify that the module runs at 230 Volts, AC current and absorbs 4 Amperes. The writeable memory portion of the tags of the dispensing machine of table 1 example is also provided with a quality assurance code that is written in the tag memory specifying by whom or how the module or the component was tested for quality before leaving the manufacturer's premises.

Moreover, the tags are provided with their initialization data, e.g. the date of the first use of the sub-assembly or sub-sub-assembly. This date is written on the write-once memory portion of the tag, and is written in the factory or by the CPU when the dispensing machine is assembled. In the example of table 1 the initialization date is shown as Jan. 1, 2004 for the coffee components and as Oct. 10, 2003 for the chocolate dispenser assembly 2. From this information the CPU is able to distinguish if a module which is inserted or plugged into the machine is new or refurbished. For modules having a life-span depending also on production date, e.g. food modules and some hardware modules such as pumps, the initialization data will preferably include also their production date or testing/quality control date. The controller will deny use of a membrane pump that is too old because the membrane will probably be too rigid after a pre-defined time period has passed.

Table 2 shows the information data contained in the tags of the sub-modules and sub-assemblies listed in the first column and is given as a further non-limiting example.

In table 2 a similar layout is shown; in this embodiment, besides the serial number, the write-once portion of the tag is provided with a read-only number that is used both for identifying the type of module and for transforming the serial number into the manufacturer code. In this case the algorithm provides to multiply the read-only number by 7, add the result to the serial number and divide by three: i.e. [(r-only No.×7)+ser. No.]/3=manufacturer code. In practice the algorithms used for coding will be more complex to safely code the serial numbers or another information written in the write-once portion by the manufacturer.

The electronic tag may also contain information regarding the expected life-span of the related module, in terms of operating hours (10000 hours) or cycles (1000 coffees dispensed) available in cumulated or de-cumulated form, i.e. indicating the total No. of cycles performed or still missing before completion of the life span. In this way the CPU can send a warning message, through the machine display or in any other suitable way (see e.g. output in FIG. 1), requesting technical assistance when a sub-assembly is getting close to the end of its expected life-span, allowing for its "just in time" replacement.

It should be understood that the apparatus according to the present invention permits to enhance the control of the internal parts of the dispensing/vending machines. When a module with its electronic tag is connected to a machine provided with the apparatus of the invention, the CPU, through the tag reader, can collect all the information regarding the said module. First, compatibility of the new module with the machine is checked by the CPU; once the CPU collects the "sensible data" of the new module, the same CPU can adapt itself, and the way the machine works, to the new configuration, thus allowing for a "plug and play" connection of the new module or assembly if the latter module is a version endorsed by the dispensing machine software.

Thanks to the re-writable memory, the tags of the dispensing machine are provided with an internal counter, which can be used to track the effective usage of the modules. For example, every time a beverage is dispensed by the machine, the beverage being prepared for example by the module ESPRESSO, the tag reader writes on tag 2 that one cycle has been carried out. This information is preferably memorized by erasing each time a cycle is carried out part of an information concerning the total amount of cycles.

Considering table 1, CODE 1 and CODE 2 are counters for the tags of the ESPRESSO module sub-assemblies 5 and 6. These codes actually give an information about the usage of the related sub-assembly, i.e. the CPU will collect this information and compare the cycles executed by the sub-assemblies with the total cycles provided in their life-span, thus getting an indication of the residual life-span of the sub-assemblies.

The presence of the writeable and rewriteable memory is of great interest in those assemblies that are involved with food product containers such as the chocolate dispenser.

As previously explained, a problem of the state of the art dispensing machines is to have a control over the products that are fed to the dispenser. The solution found up to now was to provide each single portion (e.g. each snack or each single-portion package of coffee, tea or chocolate) with a bar code or a tag having an ID code authorizing the machine to use it.

This solution proved to be very expensive and unpractical in that it requires a huge data bank of the codes of the product packages. A tag on a bulk container, e.g. on a container of coffee beans or of chocolate powder, provides a cheaper solution but this solution could be circumvented by refilling the container (that has the authorized ID code) with unauthorized products once the original ones are finished.

By using a tag with a re-writable memory which is logically connected to the controller of the machine, it is possible to keep an account of the amount of product used so as to compare this amount, e.g. in the form of number of coffees made, with the original amount. Such writing can easily be carried out e.g. by having an original memory of 100 coffees on the tag and by progressively reducing it by erasing a corresponding portion of the memory upon each coffee that is brewed by the machine until a zero amount is reached. The container condition is thus as follows: a tag code in the read-only memory, a tag code in the write-once memory that takes into the account the first time the tag was connected with the tag reader (initialization date possibly coded through the algorithm), and the re-writable memory now set to zero products. The container cannot be refilled with unauthorized products because the memory says zero products are present and if a re-filled but unauthorized container is inserted into the dispensing machine, the memory will again read zero, thus blocking any product from being dispensed. If the food container is disposable, the new one will have again an initial 100 coffee setting. If the food container is not thrown away, the setting of the empty container should be brought back to 100 once the container is re-filled.

In order to set back the food container memory to 100 coffees, a tag is associated to a fresh amount of food even without being secured to the food package. This tag has a memory instructing the tag reader to accept another 100 coffees or to correspondingly re-write the food container tag and can be attached e.g. to a piece of paper such as the invoice for a coffee amount corresponding to 100 coffees. When the "invoice tag" is shown to the tag reader, it will be read and the scanner will re-set the number of coffees back to 100.

As previously mentioned, in a further embodiment of the present invention, at least one tag is an active electronic tag interfaced with a sensor having the function to sense an operative parameter or a condition of the machine. For example the sensor may be a pressure sensor or a temperature sensor for measuring, respectively, the pressure and the temperature inside the boiler. Another sensor could be a flowmeter or a proximity sensor to detect the distance between two parts operatively cooperating in the production and dispensing of the required food product. This configuration allows for the control of the internal operation of the modules: when the tag senses an unacceptable the value of the temperature inside the boiler, this information is transmitted to the CPU (through the tag reader), the CPU will, possibly after comparing this value with a reference value, activate a new independent routine as a feedback to this information, e.g. increasing or reducing the heating of the water. Similarly, when the proximity sensor detects a distance greater or smaller than acceptable, it will activate through the tag reader and CPU a feedback routine that will correct the distance.

Figure 7:
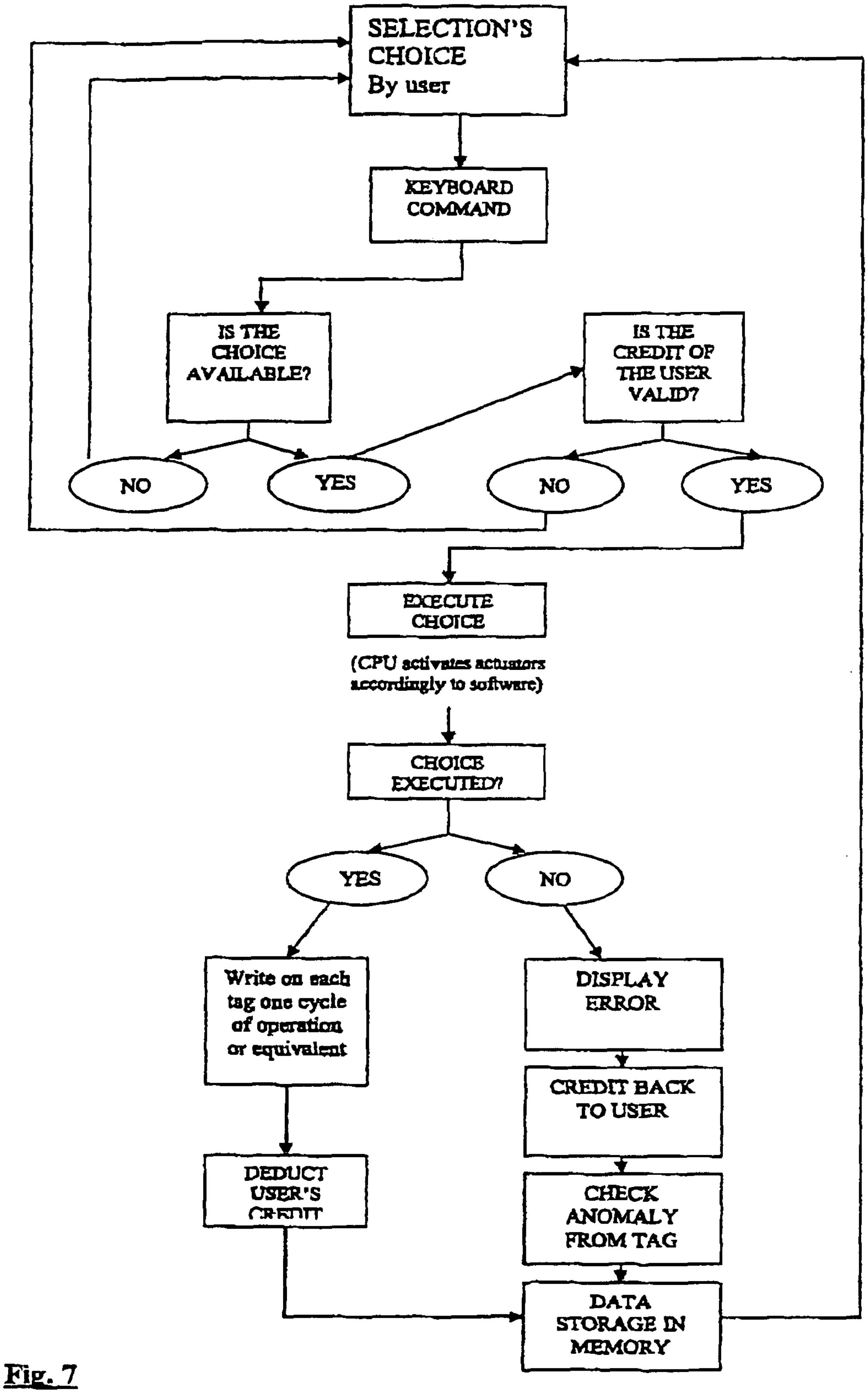
FIG. 7 is a diagram of the functioning of a machine according to the invention.

FIG. 7 is a non-limiting example of operation of a dispensing machine. The user will select a choice on the keyboard through the keyboard command. If the choice is available, i.e. if the module corresponding to the selected choice, e.g. cappuccino, is present and in operating condition, the CPU will then check if the user is authorized to select the chosen option. If this is the case the CPU will actuate the module(s) to carry out the selected choice and, once it has been carried out and the cappuccino dispensed, it will write on the memory of each tag involved that one cycle has been performed. This writing can be expressed through other ways depending on the module, such ways could be the amount of product used or the volume of water used etc.

The above disclosed dispensing machine is also useful when a control of its operation depending on the user is required. In this case the user is the holder of an ID tag containing a defined consumable amount of "operating capacity" that will allow the user to access all or only some of the dispensable products by enabling or disenabling the corresponding modules. E.g. in a vending location the employees may be granted a fixed amount of free coffee per day but cappuccino or chocolate products might be obtainable only upon payment.

TABLE 1

| DATA OR INFORMATION WHICH CAN BE STORED AND READ INTO/FROM ELECTRONIC TAGS (CODIFIED) | ASSEMBLY 1 | | | | ASSEMBLY 2 |
|---|---|---|---|---|---|
| | Sub-assembly 1 (espresso module) | | | | |
| | Sub-sub-assembly 5 (motor) | Sub-sub-assembly 6 (infusion module) | Sub-assembly 2 (boiler) | Sub-assembly 3 (grinder motor) | Sub-assembly 4 (chocolate dispenser) |
| TAG SERIAL NUMBER | 001 | 005 | 002 | 003 | 004 |
| MANUFACTURER CODE | 100.5 | 102.5 | 101 | 101.5 | 102 |
| VOLTS | 230 | NA | 230 | 230 | 230 |
| AC/DC | AC | NA | AC | AC | AC |
| MAX. ABSORBTION (AMPERE) | 5 (A) | NA | 4 (A) | 2 (A) | 1 (A) |
| INITIALIZATION DATE | Jan. 01, 2004 | Jan. 01, 2004 | Jan. 01, 2004 | Jan. 01, 2004 | Oct. 10, 2003 |
| LIFE-SPAN OR MAINTENANCE PROGRAM | 10000 | 30000 | 10000 | 7500 | 30000 |
| UNITS | HOURS | CYCLES | HOURS | CYCLES | CYCLES |
| QUALITY ASSURANCE CODE | Q1 | Q1 | Q3 | Q4 | Q15 |
| REWRITABLE MEMORY - COUNTER - RESET | CODE 1 | CODE 2 | CODE 3 | CODE 1 | CODE 4 |
| SENSOR CURRENT READ OUT | 3.5 | NA | 103 | 2.4 | NA |
| UNIT | AMPERE | NA | C. ° | AMPERE | NA |

NA = Not Available

TABLE 2

| | Read/only number | Serial number | Electrical Rating | Rated absorbtion | Rated speed | Design up-date # | Manufacturer code | Initialisation date | Quality control # | Current read-out |
|---|---|---|---|---|---|---|---|---|---|---|
| Brewing unit | 1 | 11 | Not used | Not used | Not used | 4 | 0006 | 010104 | 111 | In place |
| Esp. Coffee heating element | 2 | 12 | 230 VAC | 5 Amp | Not used | 2 | 08.66 | 010104 | 111 | 4 Amp |
| Temperature sensor | 3 | 13 | 5 VDC | 0.002 Amp | Not used | 1 | 11.33 | 010104 | 111 | 105° C. |
| Grinder motor | 4 | 14 | 230 VAC | 5 Amp | 50 RPM | 1 | 0014 | 010104 | 111 | Non activated |
| Grinder blades | 5 | 15 | Not used | Not used | Not used | 1 | 16.66 | 011203 | 100 | In place |
| Brewing unit motor | 6 | 16 | 24 VDC | 2 Amp | 25 RPM | 1 | 19.33 | 010104 | 111 | 21 VDC |
| Milk container | 7 | 17 | Not used | Not used | Not used | 3 | 0022 | 010104 | 122 | In place |
| Milk motor | 8 | 18 | 24 VDC | 0.5 Amp | 80 RPM | 1 | 24.66 | 010104 | 111 | 21 VDC |
| Milk whipper body | 9 | 19 | Not used | Not used | Not used | 3 | 27.33 | 010104 | 111 | In place |
| Milk whipper motor sensor 1 | 10 | 20 | 24 VDC | 0.8 Amp | 15000 RPM | 1 | 0030 | 011203 | 101 | 3500 RPM |
| Soluble drinks heating element | 11 | 21 | 230 VAC | 6 Amp | Not used | 2 | 32.66 | 010104 | 111 | Activated |
| Sol. Drinks heater's temp. sensor | 12 | 22 | 5 VDC | 0.002 Amp | Not used | 2 | 35.33 | 010104 | 111 | 87° C. |

The invention claimed is:

1. A dispensing machine assembly, comprising:

at least one module comprising an amount of replenishable consumables, said at least one module including a tag, said tag having a read-only memory portion and a writable memory portion; and a controller device to interact with said tag, wherein said tag contains a re-writable memory portion containing consumable data concerning the amount of replenishable consumables, said controller device being configured to progressively re-write said data in said tag re-writable memory portion to indicate a depletion of the amount of replenishable consumables and to deny use of the at least one module after all the data have been altered and the amount of replenishable consumables have been depleted, wherein the controller device is configured to re-write the consumable data to indicate a replenishment of consumables associated with the at least one module to allow use of the at least one module upon replenishment, wherein said at least one module is selected from a food container and a machine module, and said consumable data comprise a quantity of machine cycles.

2. The dispensing machine assembly according to claim 1, wherein the consumable data include the life span of the machine module.

3. The dispensing machine assembly according to claim 1, wherein said at least one module comprises a food product container, and wherein the tag provided to said food product container is detached from said container, and the consumable data concerns an amount of food.

4. The dispensing machine assembly according to claim 1, wherein the tag contains identification data to identify the at least one module, and wherein the read-only memory portion contains first data and the writable memory portion contains second data, said second data contains said first data modified through a coding algorithm, to provide at least part of said identification data.

5. The dispensing machine assembly according to claim 1, wherein the at least one module is reusable, and wherein the re-writable memory is re-written to allow reuse.

6. A method of controlling operation of a dispensing machine assembly, the method comprising:

providing at least one module;

providing a tag to the at least one module;

at least one of reading, writing, and transmitting information data on or through said tag by a controller device, characterized in that said at least one module comprises a re-writable memory portion initially containing data concerning an amount of replenishable consumables;

progressively re-writing said data with use of the at least one module;

denying use of the at least one module after all the data have been altered;

replenishing the amount of replenishable consumables in the at least one module;

re-writing the data concerning the amount of replenishable consumables replenished to allow use of the at least one module upon replenishment; and selecting said data on consumables from at least one of a number of performable operations and a number of remaining cycles before exhaustion of a life-span of the at least one module, wherein said at least one module comprises a food product container, and said data are an amount of food.

7. The method according to claim 6, further comprising:

providing said tag is provided with a read-only memory comprising first data and with a writable memory, wherein identification data are obtained by reading said first data, elaborating said first data through an algorithm and writing said data coded by the algorithm in a portion of the writable memory on said tag.

8. The method according to claim 6, further comprising:

reusing the at least one module; and re-writing the re-writable memory to allow reuse of the at least one module.

9. A dispensing machine assembly, comprising:

at least one module, said at least one module including a tag, said tag containing a re-writable memory portion with data; and a controller and tag reader configured to read and alter said data contained on the re-writable memory portion to indicate depletion of the at least one module, wherein the tag is configured to indicate to the controller and tag reader when the at least one module has been depleted and to deny use of the at least one module after all the data have been altered to prevent further use in the assembly, and further wherein the data is re-writable to indicate to the controller and tag reader that the at least one module has been replenished to allow use of the at least one module upon replenishment, wherein the at least one module is adapted to contain contents to be dispensed by the assembly, wherein the tag is adapted to indicate that the at least one module is depleted when the at least one module does not contain contents for dispensing, and wherein the tag is adapted to indicate that the at least one module is replenished when refilled with contents.

10. The dispensing machine assembly according to claim 9, wherein the data on the tag is adapted to be re-written to indicate a replenished amount of contents.

11. The dispensing machine assembly according to claim 9, wherein the at least one module is a component that facilitates dispensing by the assembly.

12. The dispensing machine assembly according to claim 11, wherein the tag is adapted to indicate that the at least one module is depleted when a predetermined life span or number of cycles of the component has been reached.

13. The dispensing machine assembly according to claim 12, wherein the tag is adapted to indicate that the at least one module is replenished after maintenance work has been performed on the at least one module.

14. The dispensing machine assembly according to claim 13, wherein the data on the tag is adapted to be re-written to indicate the predetermined life span or number of cycles.

15. The dispensing machine assembly according to claim 9, wherein the tag contains a read-only memory portion and a write-once memory portion, said write-once memory portion written by the controller to indicate initialization data.

16. A method of controlling a dispensing machine assembly for dispensing consumables, comprising:

inserting a reusable module into the dispensing machine assembly, said module being provided with a tag having a re-writable memory portion, and said re-writable memory portion containing data;

incrementally dispensing consumables such that with each increment a controller and tag reader re-write the data to indicate use of the module, said controller and tag reader determining whether the module is authenticated to allow its use;

denying use of the module when the data contained on the tag indicates depletion of the module;

replenishing the module;

re-writing the data contained on the tag to allow use of the at least one module upon replenishment; and dispensing consumables from the module.

17. The method according to claim 16, further comprising:

re-writing the data to indicate depletion when the module contains no consumables.

18. The method according to claim 17, further comprising:

replenishing the module by refilling the module with new consumables.

19. The method according to claim 18, further comprising:

re-writing the data to indicate an amount of new consumables replenished by refilling the module.

20. The method according to claim 16, further comprising:

dispensing consumables at least partially through the module.

21. The method according to claim 20, further comprising:

re-writing the data to indicate depletion when a predetermined life span or number of cycles has been reached.

22. The method according to claim 21, further comprising:

replenishing the module by performing maintenance thereon.

23. The method according to claim 22, further comprising:

re-writing the data to indicate a replenished life span or number of cycles.

24. The method according to claim 16, wherein the tag contains a read-only memory portion and a write-once memory portion, and the method further comprises writing said write-once memory portion by the controller to indicate initialization data.

25. A dispensing machine assembly, comprising:

at least one module comprising an amount of replenishable consumables, a tag being provided to said at least one module, said tag having a read-only memory portion and a writable memory portion; and a controller device to interact with said tag, wherein said tag contains a writable memory portion containing consumable data concerning the amount of replenishable consumables, said controller device being configured to progressively re-write said data in said tag to indicate a depletion of the amount of replenishable consumables and to deny use of the at least one module after all the data have been altered and the amount of replenishable consumables have been depleted, wherein the controller device is configured to re-write the consumable data to indicate a replenishment of consumables associated with the at least one module to allow use of the at least one module upon replenishment, wherein said at least one module comprises a food product container, and wherein the tag provided to said food product container is detached from said container, and the consumable data concerns an amount of food.

26. The dispensing machine assembly according to claim 25, wherein said data is altered on the controller device.

27. The dispensing machine assembly according to claim 25, wherein said writable memory portion is re-writable.

28. A dispensing machine assembly, comprising:

at least one module comprising an amount of replenishable consumables, a tag being provided to said at least one module, said tag having a read-only memory portion and a writable memory portion; and a controller device to interact with said tag, wherein said tag contains a re-writable memory portion containing consumable data concerning the amount of replenishable consumables, said controller device being configured to progressively re-write said data in said tag re-writable memory portion to indicate a depletion of the amount of replenishable consumables and to deny use of the at least one module after all the data have been altered and the amount of replenishable consumables have been depleted, wherein the controller device is configured to re-write the consumable data to indicate a replenishment of consumables associated with the at least one module to allow use of the at least one module upon replenishment, wherein the tag contains identification data to identify the at least one module, and wherein the read-only memory portion contains first data and the writable memory portion contains second data, said second data contains said first data modified through a coding algorithm, to provide at least part of said identification data.

29. A method of controlling operation of a dispensing machine assembly, the method comprising:

providing at least one module;

providing a tag to the at least one module;

at least one of reading, writing, and transmitting information data on or through said tag by a controller device, characterized in that said at least one module comprises a re-writable memory portion initially containing data concerning an amount of replenishable consumables;

progressively re-writing said data with use of the at least one module;

denying use of the at least one module after all the data have been altered;

replenishing the amount of replenishable consumables in the at least one module;

re-writing the data concerning the amount of replenishable consumables replenished to allow use of the at least one module upon replenishment; and providing said tag is provided with a read-only memory comprising first data and with a writable memory, wherein identification data are obtained by reading said first data, elaborating said first data through an algorithm and writing said data coded by the algorithm in a portion of the writable memory on said tag.

30. A method of controlling a dispensing machine assembly for dispensing consumables, comprising:

inserting a reusable module into the dispensing machine assembly, said module being provided with a tag having a re-writable memory portion, and said re-writable memory portion containing data;

incrementally dispensing consumables such that with each increment a controller and tag reader re-write the data to indicate use of the module, said controller and tag reader determining whether the module is authenticated to allow its use;

denying use of the module when the data contained on the tag indicates depletion of the module;

replenishing the module;

re-writing the data contained on the tag to allow use of the at least one module upon replenishment; and dispensing consumables at least partially through the module.

31. A method of controlling a dispensing machine assembly for dispensing consumables, comprising:

providing a reusable module into the dispensing machine assembly, said module being associated with a tag detached from said reusable module, the tag having a readable memory portion and a re-writable memory portion, and said readable memory portion containing data;

reading the data from the readable memory portion with a tag reader in communication with a controller and writing the data to the re-writable memory portion;

incrementally dispensing consumables such that with each increment the controller and the tag reader re-write the data on the re-writable memory portion to indicate use of the module, said controller and tag reader determining whether the module is authenticated to allow use of the module based on the data on the re-writable memory portion;

denying use of the module when the data contained on the re-writable memory portion indicates depletion of the module;

replenishing the module; and dispensing consumables at least partially through the module.

* * * * *